(12) United States Patent
Nussbaum (10) Patent No.: US 6,950,792 B1
(45) Date of Patent: Sep. 27, 2005

(54) ARRANGEMENT FOR PROVIDING INTERNATIONAL PROMPTS IN A UNIFIED MESSAGING SYSTEM

(75) Inventor: Paul Alton Nussbaum, Midlothian, VA (US)

(73) Assignee: Cisco Technology, Inc., San Jose, CA (US)

( * ) Notice: Subject to any disclaimer, the term of this patent is extended or adjusted under 35 U.S.C. 154(b) by 904 days.

(21) Appl. No.: 09/694,896

(22) Filed: Oct. 25, 2000

(51) Int. Cl.[7] .......................... G10L 21/00; G10L 15/22
(52) U.S. Cl. .......................... 704/8; 704/270; 704/277; 379/88.01; 379/88.05
(58) Field of Search .................. 704/8, 270, 277; 379/88.01, 88.05, 88.16, 88.22

(56) References Cited

U.S. PATENT DOCUMENTS

| | | | |
|---|---|---|---|
| 5,412,712 A | * | 5/1995 | Jennings .................. 379/88.05 |
| 5,524,137 A | * | 6/1996 | Rhee ........................ 379/88.01 |
| 5,724,406 A | | 3/1998 | Juster |
| 6,058,166 A | * | 5/2000 | Osder et al. ............. 379/88.22 |
| 6,289,513 B1 | * | 9/2001 | Bentwich .................... 717/106 |
| 6,615,177 B1 | * | 9/2003 | Rapp et al. ................. 704/277 |
| 6,691,100 B1 | * | 2/2004 | Alavi et al. .................... 707/2 |
| 6,757,530 B2 | * | 6/2004 | Rouse et al. ............. 455/412.1 |

OTHER PUBLICATIONS

Reager, "Globalization Installment #2", International Services.com (@I.S.).

* cited by examiner

Primary Examiner—Susan McFadden
(74) Attorney, Agent, or Firm—Leon R. Turkevich (57) ABSTRACT

Provided is an arrangement that enables deployment of international prompts in a voice messaging system based on a server configured for dynamically generating a selected concatenated prompt, from stored prompt fragments, in a selected language.

41 Claims, 5 Drawing Sheets

Figure 1A (PRIOR ART)

| | 1 | 2 | 3 | 4 | 5 | |
|---|---|---|---|---|---|---|
| You have | - | # | Message(s) | - | English |
| In your mailbox | - | # | Message | You have | Japanese |
| You have | Message | | # | Message | - | Thai |

| Lang. | Part 1 | Part 2 | Part 3 | Part 4 | Part 5 | Part 6 | Part 7 |
|---|---|---|---|---|---|---|---|
| English | At | - | 12 | - | 15 | am | - |
| Span. | A las | - | doce | - | Y cuarto | De la madrugada | - |
| French | A | - | Minuit | - | Et quart | Du matin | - |
| Japan. | - | Gozen | Jyuuniji | - | Jyuuyon pun | - | Ni |
| Germ. | Um | - | Nul uhr | - | 15 | - | - |
| Hindi | - | Raat ke | Barrah | - | Baj kar pandra minute | - | par |

| Language | Part 1 | Part 2 | Part 3 | Part 4 |
|---|---|---|---|---|
| English | at | Zero | Hours 15 minutes | - |
| Spanish | A la | Medianoche | Y cuarto | - |
| German | Um | Nul uhr | 15 | - |
| French | A | Minuit | 15 | - |

14a → English, 14d → Spanish, 14f → German, 14e → French

Figure 1D (PRIOR ART) — 10d

| Lang. | Part 1 | Part 2 | Part 3 | Part 4 | Part 5 | Part 6 | Part 7 | Part 8 |
|---|---|---|---|---|---|---|---|---|
| Eng | At | - | A quarter to | - | 1 | - | Am | - |
| Span | A la | - | - | - | 1 | Menos cuarto | - | - |
| German | Um | - | Viertel vor | - | Eins | - | Morgens | - |
| French | A | - | - | - | 1 heure | Moins 15 | Du matin | - |

14a → Eng, 14d → Span, 14f → German, 14e → French

| Part 1 | Part 2 | Part 3 | Part 4 |
|---|---|---|---|
| at | zero | hundred hours | - |
| at | zero-1 | hours oh-1 minutes | - |
| at | zero-2 | hours oh-2 minutes | - |
| at | zero-3 | hours oh-3 minutes | - |
| at | zero-4 | hours oh-4 minutes | - |
| at | zero-5 | hours oh-5 minutes | - |
| at | zero-6 | hours oh-6 minutes | - |
| at | zero-7 | hours oh-7 minutes | - |
| at | zero-8 | hours oh-8 minutes | - |
| at | zero-9 | hours oh-9 minutes | - |
| at | 10 | hours 10 minutes | - |
| at | 11 | hours 11 minutes | - |
| at | 12 | hours 12 minutes | - |
| at | 13 | hours 13 minutes | - |
| at | 14 | hours 14 minutes | - |
| at | 15 | hours 15 minutes | - |
| at | 16 | hours 16 minutes | - |
| at | 17 | hours 17 minutes | - |
| at | 18 | hours 18 minutes | - |
| at | 19 | hours 19 minutes | - |
| at | 20 | hours 20 minutes | - |
| at | 21 | hours 21 minutes | - |
| at | 22 | hours 22 minutes | - |
| at | 23 | hours 23 minutes | - |
| at | 12 hundred hours | hours 24 minutes | - |
| at | 24 hundred hours | hours 25 minutes | - |
| | | hours 26 minutes | |
| | | hours 27 minutes | |
| | | hours 28 minutes | |
| | | hours 29 minutes | |
| | | hours 30 minutes | |
| | | hours 31 minutes | |
| | | hours 32 minutes | |
| | | hours 33 minutes | |
| | | hours 34 minutes | |
| | | hours 35 minutes | |
| | | hours 36 minutes | |
| | | hours 37 minutes | |
| | | hours 38 minutes | |
| | | hours 39 minutes | |
| | | hours 40 minutes | |
| | | hours 41 minutes | |
| | | hours 42 minutes | |
| | | hours 43 minutes | |
| | | hours 44 minutes | |
| | | hours 45 minutes | |
| | | hours 46 minutes | |
| | | hours 47 minutes | |
| | | hours 48 minutes | |
| | | hours 49 minutes | |
| | | hours 50 minutes | |
| | | hours 51 minutes | |
| | | hours 52 minutes | |
| | | hours 53 minutes | |
| | | hours 54 minutes | |
| | | hours 55 minutes | |
| | | hours 56 minutes | |
| | | hours 57 minutes | |
| | | hours 58 minutes | |
| | | hours 59 minutes | |

Figure 3

|         | Part 1                  | Part 2           |
|---------|-------------------------|------------------|
| English | The Message Was Received | At 1:45 PM       |
| Japanese| At 1:45 PM              | Received Message |

Figure 4A

|         | Part 1             | Part 2              |
|---------|--------------------|---------------------|
| English | The Fax Will Be Sent | At 1:45 PM          |
| Japanese| At 1:45 PM         | The Fax Will Be Sent |

ARRANGEMENT FOR PROVIDING INTERNATIONAL PROMPTS IN A UNIFIED MESSAGING SYSTEM

BACKGROUND OF THE INVENTION

1. Field of the Invention

The present invention relates to an arrangement for providing international prompts in automated voice response systems such as unified communications systems.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. One such example includes unified communications systems that provide messaging services for users by providing an integrated platform for the storage and retrieval of different types of messages, such as voicemail, e-mail, fax, etc.

One particularly desirable feature for automated voice response systems would be the ability to develop and deliver new voice prompts in new languages. A voice prompt is pre-recorded speech that is played back to a user as part of an audible user interface of an application. It is usually recorded by an actor or voice model in a professional studio based on a pre-authored script. The voice prompts are then digitized and stored in electronic format before they are used by an interactive voice response application.

Most voice prompts are stored as whole sentences, referred to as whole sentence prompts, that contain no context sensitive information. These whole sentence prompts have the advantage that the prompt sounds more professional and the voice model can more easily record a professional version of the prompt if it is a whole sentence. Whole sentence prompts also are easier to manage, as the text script of the prompt often reveals its usage in the audio user interface (UI).

In addition, whole sentence prompts do not use context sensitive aspects (e.g., variables) because use of such context sensitive aspects may be unclear and their meaning ambiguous; for example, "Do you want to delete it?" may be ambiguous, whereas "Do you want to delete the message?" is more readily understood and does not assume context sensitive definition of the direct object "it". Hence, whole sentence prompts without context sensitive information can almost always be directly translated into any another language as a complete sentence with no context sensitive information.

Whole sentence prompts, however, cannot be used to convey variables or context sensitive information, such as date, time, or number of messages. Hence, concatenated prompts (also referred to as sentence fragments, phrases, simple phrases, compound phrases, tabular prompts, variable prompts, etc.) are needed to convey information having variables or context information. Examples of concatenated prompts include "You have five new messages," as well as "Good Morning," which might need to be chosen from a group of possible phrases depending on the time of day.

Unfortunately, concatenated prompts cause difficulties in generating a complete sentence, especially when attempting to develop multiple language systems for international deployment. For example, different languages have different agreement rules (gender, tense, plurality, etc. ex: one message, two messages). In addition, some words are pronounced differently if they appear next to other words (precede a word beginning with a vowel, etc. ex: a fax, an address). Homonyms are different in different languages, affecting re-use of prompt segments. Context also is very important to translating a prompt, hence the translator needs to see all the possible sentences a prompt will be used in.

Translation typically requires printing of a script of the translated prompt for review, and for use by the voice model to speak aloud in the studio. The script must be written in the character set of the language, as transliteration into European character sets is not useful. Often an expensive combination of computer, operating system, and word processing software is the only way of reasonably producing such documents in character sets such as Arabic, Japanese, etc.

In view of these issues, a linguist typically is needed to develop the script (and possibly test the end result) for the proposed prompts. Moreover, a word (or phrase's) meaning also is very important to prompt script writing, hence the linguist needs to understand the concepts being discussed in the prompts (e.g., often a linguist doesn't know what a distribution list is, etc.).

Generic systems, such as illustrated in U.S. Pat. No. 5,724,406 to Juster, are configured for providing generic scripting for a messaging application; however, these generic systems are advantageous only if nearly all of the prompts of the messaging system are concatenated prompts. Moreover, these generic systems still require a programmer to carefully coordinate with a linguist for each new language.

Another proposed concept suggests use of data structures (e.g., tables) to select prescribed components for a concatenated prompt in a corresponding selected language. For example, FIGS. 1A through 1D are diagrams illustrating data structures 10 for respective prescribed concatenated prompts having multiple components 12 selected for prescribed languages 14. In particular, the components 12 are divided from the prescribed concatenated prompt according to grammatical constructs for the corresponding language 14. For example, the prescribed concatenated prompt represented in the table 10a ("You have # messages") according to the English language 14a differs from the grammatical structure ("In your mailbox # message you have") according to the Japanese language 14b, and the grammatical structure ("You have message # message") according to the Thai language 14c. If a component 12 (e.g., 12b in the English language 14a) is to be skipped for a certain language, a skip character ("–") is used to designate that the unit should be skipped.

Figure 1A:
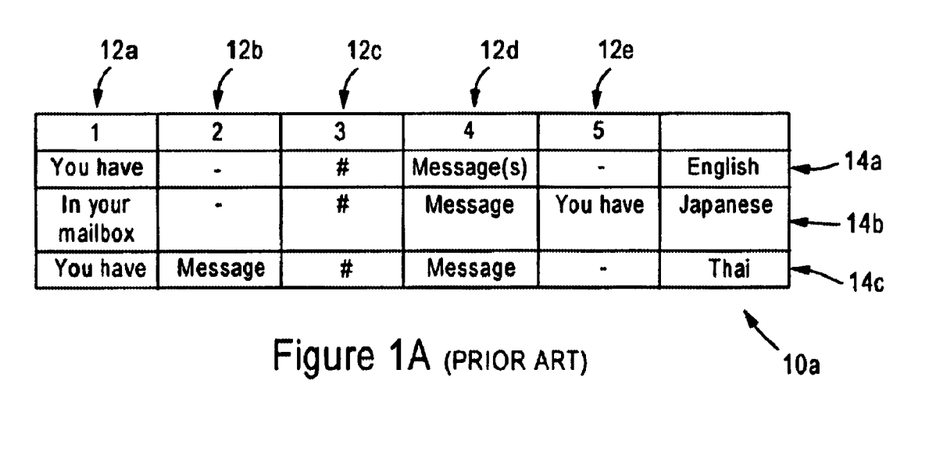
FIGS. 1A, 1B, 1C, and 1D are diagrams (prior art) illustrating data structures used to select prescribed components for a concatenated prompt.
Figure 1B:
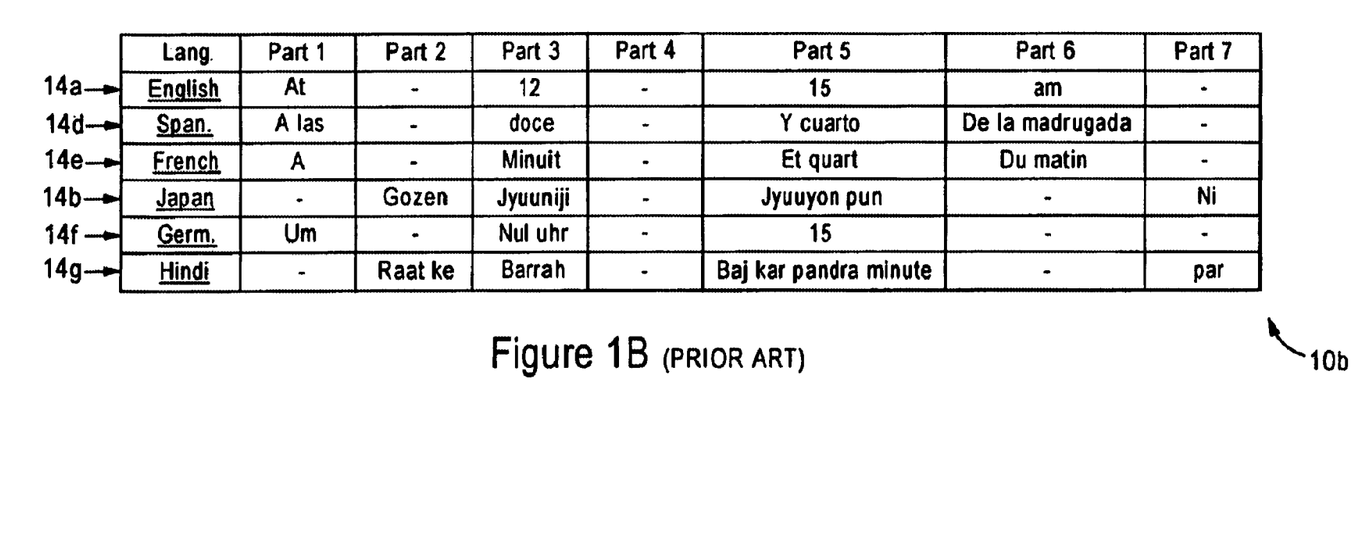
Figure 1C:
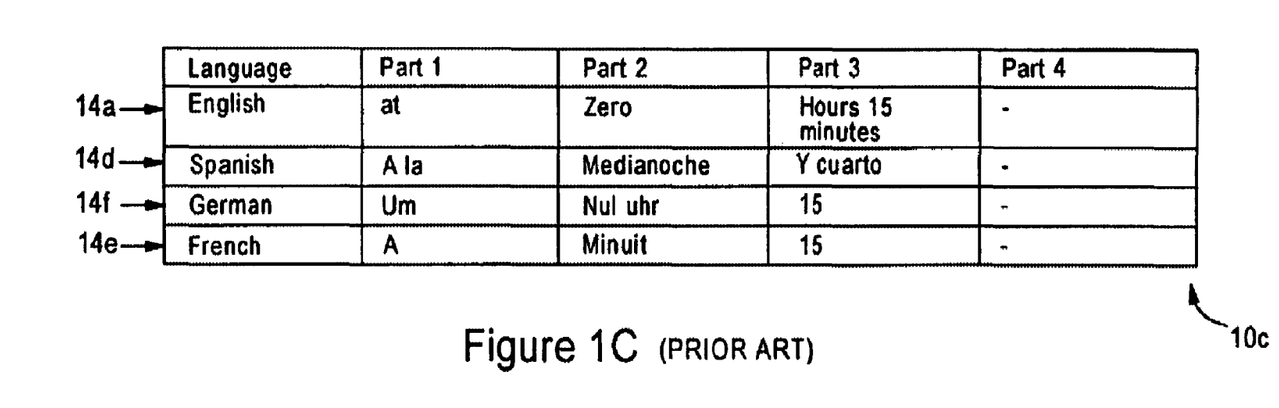
Figure 1D:
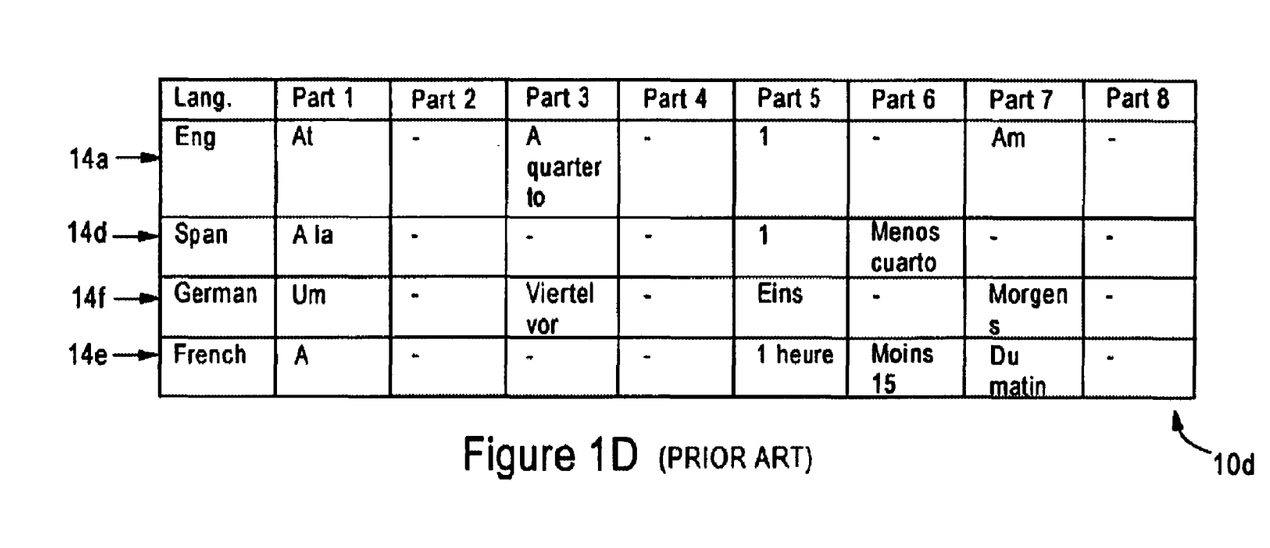

The tables 10 may also be used to describe genders, or other language components used to modify a noun. For example, Latin languages tend to have to genders, German and Arabic have three genders, while Russian may have six different "genders" that modify a noun, and that may vary depending on sentence position. In particular, FIGS. 1B, 1C, and 1D illustrate variations in representing time expressions: tables 10b, 10c, and 10d illustrate the expression "at 12:15 AM" in AM/PM format, 24-hour format, and "quarter to" format, respectively.

Unfortunately, the above data structures 10 provide only a conceptual description of organizing prompts, and do not provide sufficient information for implementation and deployment of a commercially viable messaging system. For example, implementation concerns include the manner in which the tables are stored and accessed, selection of entries within each column, and storage of the data structures in the accompanying audio prompts. In particular, the above data structures need to be implemented in an efficient manner that ensures that redundant data is minimized, and that CPU resources are efficiently utilized.

SUMMARY OF THE INVENTION

There is a need for an arrangement that enables deployment of international prompts in a voice messaging system with efficient utilization of CPU resources and minimal redundant data, including minimal redundant stored audio prompts.

There also is a need for an arrangement that enables prompts in different languages to be added to a voice messaging system with minimal coordination between a linguist and a programmer of the voice messaging system.

These and other needs are attained by the present invention, where a server is configured for dynamically generating a selected concatenated prompt, from stored prompt fragments, in a selected language. The server includes a first executable resource configured for identifying a selected concatenated prompt and a selected language, based on reception of a prompt request. The server also includes, for each of the concatenated prompts, a corresponding second executable resource selectively invoked by the first executable resource based on identification of the corresponding selected concatenated prompt, the corresponding second executable resource configured for obtaining language-independent information for the selected concatenated prompt from a first database configured for storing the language-independent information for each of a plurality of concatenated prompts. The language-independent information may include global variables necessary for generation of the selected concatenated prompt, or identification of prompt components or variable portions (e.g., time of day, number of messages, etc.). The corresponding second executable resource also is configured for identifying how specific language information is to be accessed. The first executable resource, based on execution of the corresponding selected second executable resource, accesses the language-specific information for the selected concatenated prompt, and in response generates the selected concatenated prompt in the selected language based on retrieval of the stored prompt fragments identified by the language-specific information for the selected concatenated prompt.

One aspect of the present invention provides a method in a server of generating a concatenated prompt. The method includes identifying a selected concatenated prompt and a selected language based on reception of a prompt request, and executing a selected executable resource for the selected concatenated prompt. The selected executable resource obtains language-independent information for the selected concatenated prompt from a database configured for storing the language-independent information for each of a plurality of concatenated prompts. Language-specific information for the selected concatenated prompt is accessed based on the obtained language-independent information for the selected concatenated prompt. The selected concatenated prompt is generated in the selected language based on selective retrieval of stored prompt fragments identified by the language-specific information for the selected concatenated prompt. The execution of a selected executable resource for operations including obtaining language-independent information for the selected concatenated prompt enables deployment of a prompt generation architecture having language independent information separate from language-specific information, facilitating the addition of new languages to the existing server. In addition, the separation of language independent information from language-specific information enables the presence of redundant data to be minimized. Finally, the separation of language independent information from language-specific information enables additional concatenated prompts to be added, often with minimal additions to the language-specific or the stored prompt fragments.

Another aspect of the present invention provides a server system configured for dynamically generating a selected concatenated prompt in a selected language from stored prompt fragments. The server system includes a first executable resource configured for identifying a selected one of a plurality of concatenated prompts and a selected one of a plurality of languages, based on reception of a prompt request. The server also includes second executable resources configured for accessing language-independent information for the concatenated prompts, respectively. The first executable resource configured is for initiating execution of a corresponding selected one of the second executable resources based on identification of the corresponding selected concatenated prompt, and the selected second executable resource is configured for locating language-specific information for the corresponding selected concatenated prompt based on accessing the corresponding language-independent information. The server system also includes a first database for storage of stored prompt fragments. The first executable resource accesses the language-specific information for the selected concatenated prompt based on location thereof by the corresponding selected second executable resource, and the first executable resource generates the selected concatenated prompt in the selected language based on retrieval of a selected group of the stored prompt fragments identified by the language-specific information for the selected concatenated prompt.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 2:
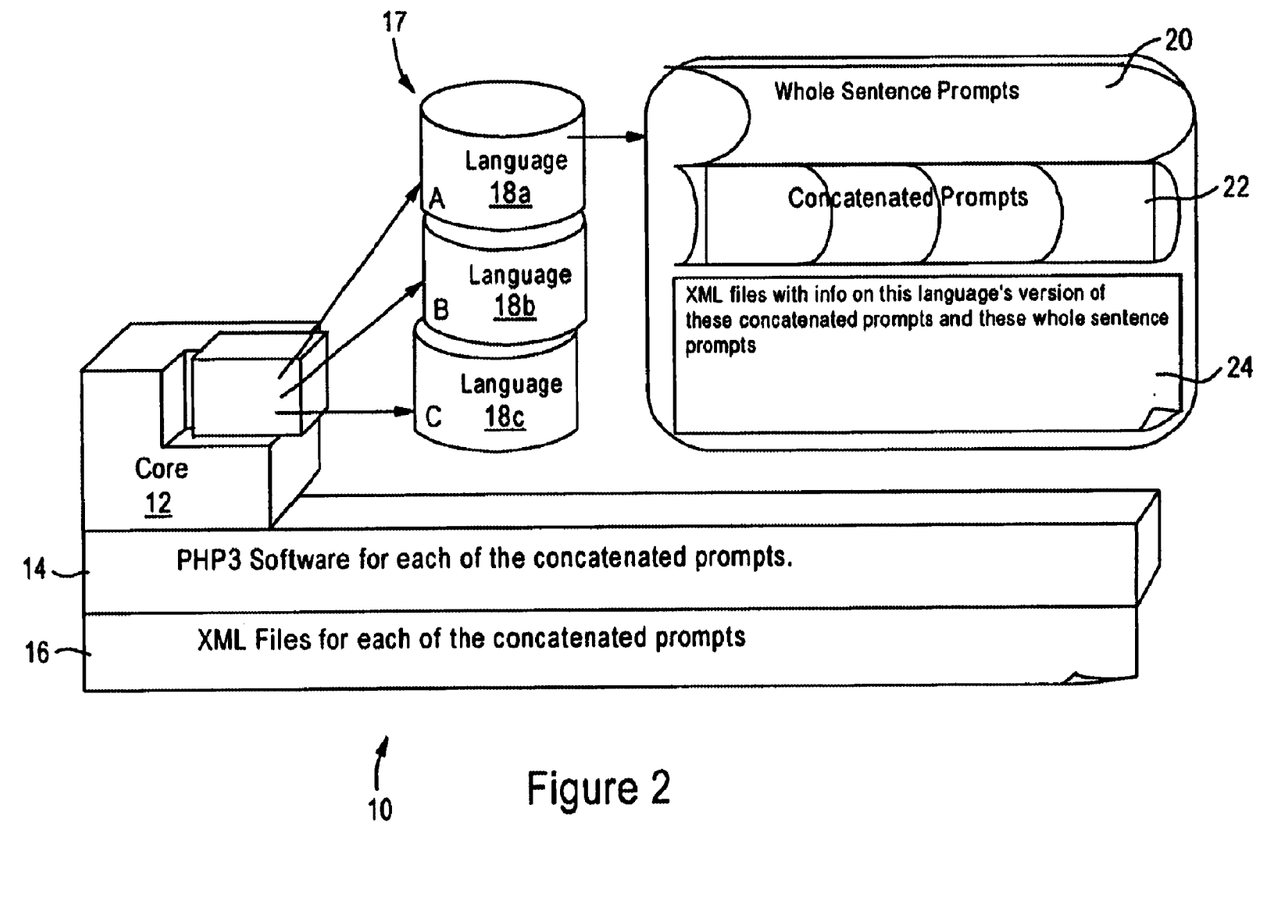
FIG. 2 is a diagram of a server system configured for dynamically generating a selected concatenated prompt in a selected language according to an embodiment of the present invention.

FIG. 2 is a block diagram illustrating a system configured for dynamically generating voice based prompts, including whole sentence prompts and concatenated prompts, in a selected language according to an embodiment of the present invention. The server-based system 10 typically is implemented as part of a unified messaging system such as the commercially available Cisco Unified Open Network Exchange (Cisco uOne) (Products UONE-FOUND 4.1 S, and UONE-VOICEMSG 4.1S) from Cisco Systems, Inc.

The system 10 includes an application runtime environment core 12, configured for executing the received requests by execution of a messaging application. The application runtime environment core 12 is implemented as an executable resource, for example as a server executing a PHP hypertext processor with extensible markup language (XML) parsing and processing capabilities, available open source at http://www.php.net. As described below, the application runtime environment core 12 is configured for identifying a selected prompt, for example a concatenated prompt, and a selected language based on reception of a prompt request, for example from the unified messaging application.

The server based system 10 has an architecture based on the concatenated prompts that are dynamically generated. In particular, the server based system includes a collection of PHP-based executable scripts (i.e., PHP3 script software) 14 stored on a tangible medium, where a concatenated prompt that can be dynamically generated by the core has an associated executable script stored within the collection 14. In addition, the server based system 10 includes a database 16 configured for storing text-based files (e.g., XML files) for each of the concatenated prompts. In particular, each XML file stored in the database 16 specifies language-independent information for the corresponding concatenated prompt, for example the stored prompt fragments are used to make up the concatenated prompt, the variables (e.g., time, date, quantity) are used to choose variable portions of the prompt, and how specific language information is to be accessed. Hence, each concatenated prompt to be generated by the application runtime core 12 has a corresponding executable script within the collection 14, and a corresponding XML document stored in the database 16 and providing language-independent information related to the concatenated prompt.

The server based system 10 also includes at least one additional database 17 configured for storage of language-specific information. As illustrated in FIG. 2, the database 17 uses a directory-based structure for storage of language-specific information, where directories 18a, 18b, and 18c are configured for storing language-specific information for languages A, B, and C, respectively. Each directory 18 is configured for storing language-specific information such as whole sentence prompts 20, concatenated prompt fragments 22, and XML files 24. Each whole sentence prompt 20 is stored, for example, as an audio file such as a .wav file, and represents a complete sentence expression. The concatenated prompt fragments 22 are stored as audio files, such as .wav files, and may represent a single word or even a portion of a word. Each XML document 24 stored in the corresponding language directory 18 provides language-specific information for a corresponding concatenated prompt, described below.

Hence, the application runtime environment core 12 executes a selected script from the collection 14 for retrieval of the corresponding language-independent information from a selected XML document from the database 16 for a corresponding selected concatenated prompt. Once the language-independent information has been obtained for a corresponding selected concatenated prompt, the selected script from the collection 14 accesses the language-specific information from the XML document 24 corresponding to the selected concatenated prompt within the directory (e.g., 18a) corresponding to the selected language. As described below, the hierarchal access of language-independent information based on the concatenated prompt, followed by retrieval of the language-specific information for the concatenated prompt, provides flexibility in design and deployment of concatenated prompt generation systems for multiple languages.

Figure 5:
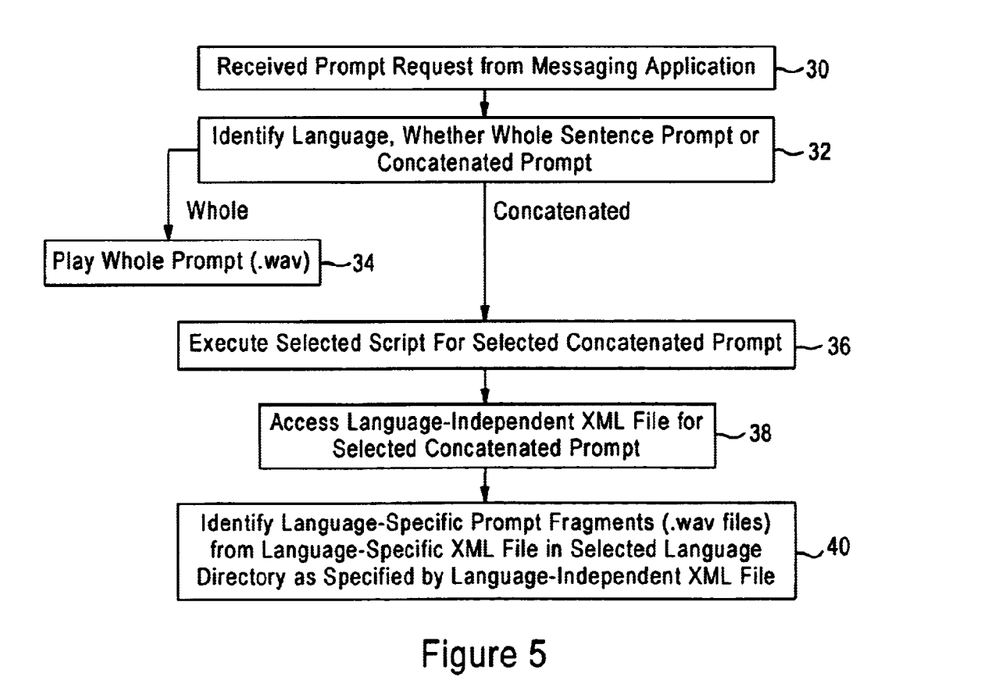
FIG. 5 is a diagram illustrating the method of generating a concatenated prompt according to an embodiment of the present invention.

FIG. 5 is a diagram illustrating the method by the server system 10 of dynamically generating a concatenated prompt according to an embodiment of the present invention. The method can be implemented as executable code stored on a computer readable medium (e.g., a hard disk drive, a floppy drive, a random access memory, a read only memory, an EPROM, a compact disc, etc.).

The method begins in step 30, where the application runtime environment core 12 receives a request for a prompt. In response to receiving a request, the application runtime environment core 12 identifies whether the prompt is a whole sentence prompt or concatenated prompt, and identifies the language in step 32. If the prompt is a whole sentence prompt, the application runtime environment core 12 merely retrieves the stored whole sentence prompt 20 from the appropriate language directory 18, and presents the whole sentence prompt 20 for playback in step 34.

However, if the prompt is a concatenated prompt, then the server system 10 needs to dynamically generate the concatenated prompt. The application runtime environment core 12 executes a selected script from the collection 14 that corresponds to the selected concatenated prompt in step 36. The selected executable script accesses the XML file for the corresponding selected concatenated prompt from the database 16 in step 38 for retrieval of language-independent information related to the corresponding selected concatenated prompt, described in detail below. The selected executable script also uses in step 40 the language specific data contained in the XML file 24 in order to identify the .wav files to be used for the audio presentation of the concatenated prompt, and/or any text components to be used for generating a text-based prompt.

The disclosed embodiment stores the XML documents 16 and 24 as data structures for storing language-independent information and language-specific information, respectively. In particular, the XML documents 16 and 24 expand on the conceptual descriptions of the data structures illustrated in FIGS. 1A, 1B, 1C and 1D to provide a system that can be deployed and efficiently managed with minimal CPU resources, or minimal modifications necessary by a programmer. Moreover, minimal interaction is required between a linguist and a programmer in adding additional languages.

Figure 3:
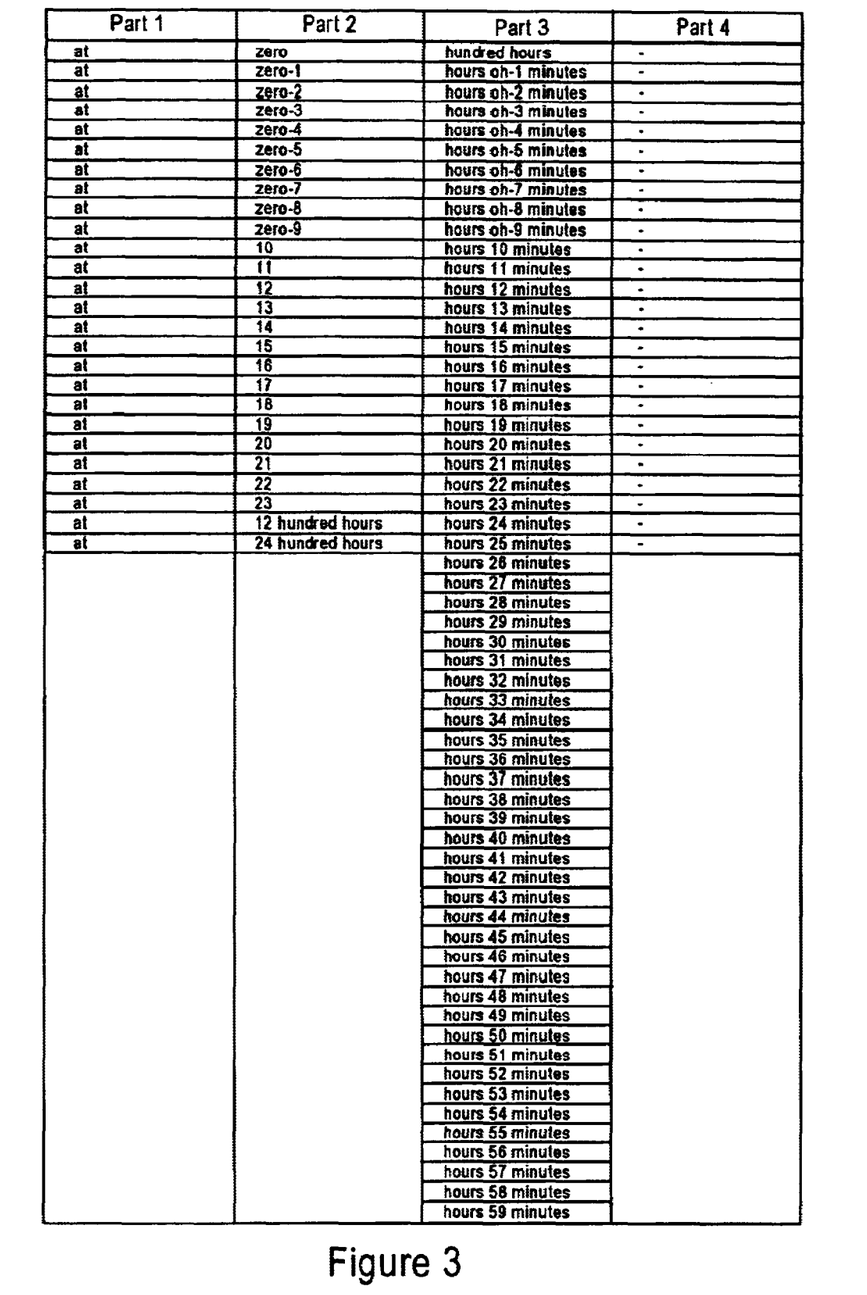
FIG. 3 is a diagram illustrating a table that specifies a prompt structure for a prescribed concatenated prompt for playback of time entries.

The XML documents 16 and 24 are written based on local and/or global variables loaded by the application runtime environment core 12. In particular, the application runtime environment core 12 and the PHP script 14 obtain pointers to necessary files based on parsing the selected XML documents. Hence, data structures such as illustrated in FIGS. 3 and 4 that are used to define the domain of available concatenated prompts are implemented as XML documents 16 and 24, illustrated in the attached appendix.

For example, pages 1–2 of the attached Appendix illustrate a language-specific XML document 24 used to define the concatenated phrase "at 1:45 PM" in English, and pages 3–4 of the attached Appendix illustrate another language-specific XML document 24 used to define the same concatenated phrase "at 1:45 PM" in Spanish. Each language-specific XML document includes a breakdown of the concatenated sentence prompt for that language, pointers to the individual .wav files to playback in various combinations, and the text (in Unicode as necessary) of that language suitable for display in a web browser configured to display text and that language. As shown on pages 1 and 2 of the attached Appendix, the language-specific XML document (as well as every XML document) includes a document type descriptor that specifies that each document has a Menu Variables section and an Options section. As illustrated above with respect to FIG. 1, the phrase "at 1:45 PM" can be theoretically be divided into seven parts:

(at) (–) (one) (–) (forty-five) (PM) (–).

This seven part structure is used within each of the XML documents 24 that define the concept "at 1:45 PM" in the respective language directories 18. For example, the XML document specifying the English language version of "at 1:45 PM" on pages 1–2 of the attached Appendix, and the XML document specifying the Spanish language version of "at 1:45 PM" on pages 3–4 to the attached Appendix, both specify seven possible Menu Variables (e.g., "Menu Variables name=1–7").

Each menu variable describes one of the parts of the concatenated sentence where each part is read left to right, Part 1 to Part N, regardless of language. The corresponding value specifies the number of .wav files that are available for the corresponding menu variable: as shown on Page 1 of the attached Appendix, the menu variables name "1" has a value of "26", indicating the XML document has 26 entries available for the corresponding value (note, however, that each entry of Options name=1_0–25 specifies the same .wav value); however, the menu variables name "2" has a value of "0", indicating that the corresponding part of the concatenated prompt does not have any wav files for the corresponding language. Hence, the XML document on pages 1 and 2 of the attached Appendix specify from the menu variables that the parts 2, 4, and 7 are unused (as illustrated by Menu Variables name=2/4/7, value="0"), hence contain zero .wav files.

As illustrated in FIG. 3, there are 60 possible .wav files for representing minutes; hence, part 5 of the concatenated prompt "at 1:45 PM" specifies 60 available .wav files. Note that all the languages for this particular concatenated prompt "at 1:45 PM" will also have 60.wav files, as illustrated by the XML tag "<Menu Variables name="5", value="60"/> for both the English version XML document on pages 1–2 and the Spanish version XML document on pages 3–4 of the attached Appendix.

The Options section of the language specific XML documents on pages 1–4 of the attached Appendix specify the .wav files to be used in the corresponding parts of the concatenated sentence prompt. For example, the English version XML document on pages 1–2 of the Appendix specifies English language .wav files (USENG_. . . ), and the Spanish version XML document on pages 3–4 of the Appendix specifies the Spanish language .wav files (SASPAN_. . . ). If the concatenated prompt "at 1:45 PM" has an unused part, then there are no .wav files specified for the unused part, as illustrated in the English version XML document by the absence of any options entries for parts 2, 4, or 7. Hence, the Options "1_0" through "1_25" specify the .wav files for the expression "at", "3_0" through "3_25" specify the .wav files for the appropriate hour, "5_0" through "5_59" specify the .wav files for the appropriate minute, and "6_0" through "6_25" specify the .wav files for the appropriate use of "AM" or "PM".

The language-independent XML file for each concatenated prompt, stored in the database 16, stores the rules and pointers that point to the appropriate executable PHP3 software within the collection 14 for generation of the corresponding concatenated prompt. Examples of the language-independent XML files stored in the database 16 are illustrated on pages 5–6 of the attached Appendix.

Each language-independent XML file 16 contains a pointer to the PHP3 executable procedure (or C code function) that will process the variables and formulate the concatenated sentence prompt in the chosen language. Using the above time example for the concatenated phrase "at 1:45 PM", exemplary variables accessed by the language-independent XML files include time of day and the language to use.

The language-independent XML document illustrated at the top of page 5 of the Appendix illustrates the language-independent XML document to be executed for generating the concatenated prompt "at 1:45 PM". The menu variable specifies a procedure (the name of the PHP3 script) stored in the collection 14 to be executed in order to gather the correct .wav files in the correct order for the chosen language. The options field specifies how many parts the concatenated prompt has been divided into: as described above, the concatenated prompt "at 1:45 PM" is divided into seven parts, independent of the language to be used. The text field of the options field specifies the name of the language-specific XML document 24 to be accessed from the corresponding language directory (e.g., 18a); in other words, each language-specific XML document for a given concatenated prompt has the same file name, hence the appropriate language-specific XML document 24 is accessed by first locating the appropriate language directory, and obtaining the language-specific XML document 24 by file name. Hence, multiple languages can easily be added by duplicating the file names of the language-specific XML documents, and storing the language-specific XML documents having the duplicate file names in respective language directories as illustrated in FIG. 2.

Page 5 of the attached Appendix illustrates XML files 16 for two concatenated prompts: one that plays the time using AM/PM format, and another that plays the time using 24-hour format. Hence, if the prompt request received by the core 12 specifies that the user prefers AM/PM format, the core 12 accesses the top XML file that specifies 7 parts, and the language-specific XML file "LSCP_AT_AMPMTIME.xml"; if the prompt request received by the core 12 specifies that the user prefers 24 hour format, the core 12 accesses the bottom XML file that specifies 4 parts, and the language-specific XML file "LSCP_AT_24TIME.xml".

Page 6 of the attached Appendix illustrates another language-independent XML file 16 used by the application runtime environment core 12 to select at run time the format which the time will be read (e.g., based on a subscriber selectable preference field). In this case, the procedure call choose_and_play_at time.proc" will not only playback the concatenated prompt, it will also choose one of the three available formats to play the concatenated prompt. The choice is based on an internal variable that has been set up prior to calling the function, for example a per subscriber configurable preference value.

Figure 4A:
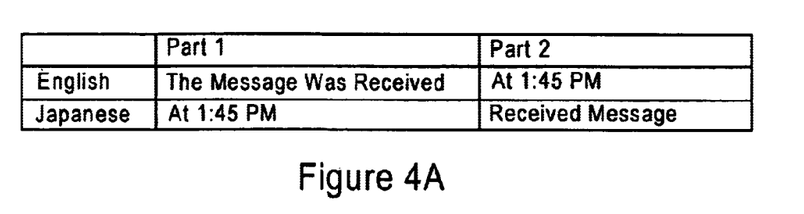
FIGS. 4A and 4B are diagrams illustrating concatenated prompts generated using nested concatenated prompts according to an embodiment of the present invention.
Figure 4B:
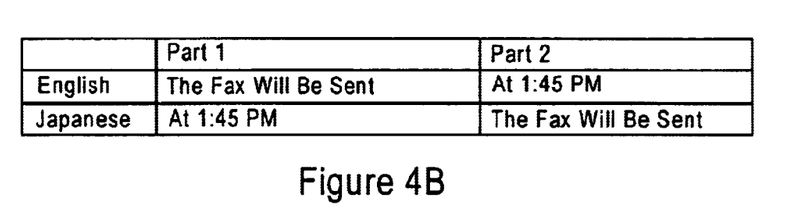

FIGS. 4A and 4B are diagrams illustrating nested prompt fragments that may be reused for multiple concatenated prompts. For example, an English concatenated prompt may read "the message received at 1:45 PM", and a corresponding Japanese prompt may read "at 1:45 PM the Message was received." In both languages, it may be desirable to reuse the language-specific information for the time expression ("at 1:45 PM") in other concatenated sentence prompt, such as "fax will be sent at 1:45 PM", or in Japanese, "At 1:45 PM the fax will be sent."

Hence, nested language-specific XML documents 24 may be used to describe concatenated prompt that share concatenated sentence fragments prompt with other concatenated sentences.

Page 7 of the attached Appendix illustrates an English language version and a Japanese language version of language-specific XML documents 24, stored in their respective language directories 18, for the concatenated prompt "message received". In particular, each XML document on Page 7 specifies only two parts, were each part has only one option. Although the first part of the English language version specifies a .wav file (USENG_MSG_RECEIVED.wav), the second part of the English language version specifies a language-independent XML file ("GCP_AT_TIME.xml"), where "GCP" specifies generic concatenated sentence information for language-independent information. In contrast, the Japanese-specific XML document on the bottom of Page 7 of the Appendix specifies a language-specific XML document (identified by the designation "LSCP") that is located in the Japanese language directory 18.

The English version of the second concatenated prompt "fax will be sent at 1:45 PM" is specified by the language-specific XML document at the top of page 8 of the attached Appendix. Note that the second part of the English language-specific XML document is identical to the English-language XML document on Page 7 of the attached Appendix, indicating that the concatenated sentence prompt "at 1:45 PM" is applicable in English to both the concatenated sentence "Message received at 1:45 PM" and to "Fax will be sent at 1:45 PM".

The Japanese language-specific XML document at the bottom of Page 8 of the attached Appendix also parallels the Japanese language-specific document at the bottom of Page 7, indicating that the concatenated sentence prompt "at 1:45 PM" in Japanese can be used as well in both concatenated sentences.

According to the disclosed embodiment, a hierarchal architecture is provided where concatenated prompts are dynamically generated by first obtaining language-independent information relating to the selected concatenated prompt, followed by retrieval of language-specific information for generation of the selected concatenated prompt in the selected language, based on the obtained language-independent information. Hence, additional languages can easily be added with minimal modifications by programmers, and without the necessity of linguists to carefully coordinate with programmers. Moreover, the disclosed arrangement provides efficient CPU utilization, enabling the prompt generation system to be scalable as languages are added for international deployments.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a server of generating a concatenated prompt, the method comprising:
   identifying a selected concatenated prompt and a selected language based on reception of a prompt request;
   executing a selected executable resource for the selected concatenated prompt;
   obtaining, by the selected executable resource, language-independent information for the selected concatenated prompt from a database configured for storing the language-independent information for each of a plurality of concatenated prompts;
   accessing language-specific information for the selected concatenated prompt based on the obtained language-independent information for the selected concatenated prompt; and
   generating the selected concatenated prompt in the selected language based on selective retrieval of stored prompt fragments identified by the language-specific information for the selected concatenated prompt.

2. The method of claim 1, wherein the executing step includes parsing a first XML document corresponding to the selected concatenated prompt.

3. The method of claim 2, wherein the obtaining step includes identifying the language-specific information based on identification of a second XML document name from the first XML document.

4. The method of claim 3, wherein the obtaining step further includes identifying a number of prompt fragment fields for specifying the stored prompt fragments for the corresponding selected concatenated prompt, each of the language-specific information for the selected concatenated prompt having a same number of prompt fragment fields, independent of the corresponding language.

5. The method of claim 3, wherein the language-specific information for the selected concatenated prompt are stored in second XML documents based on respective languages, each of the second XML documents corresponding to the selected concatenated prompt having a same second XML document name and stored in a corresponding language directory, the accessing step including obtaining the second XML document for the selected language based on the second XML document name in the corresponding language directory.

6. The method of claim 5, wherein the accessing step includes parsing the second XML document retrieved from the corresponding selected language directory and identifying relevant prompt fragment fields and nonrelevant prompt fragment fields from the parsed second XML document.

7. The method of claim 6, wherein the accessing step further includes identifying the stored prompt fragments for generation of the selected concatenated prompt from the parsed second XML document based on the identified relevant prompt fragment fields and determined prompt variables.

8. The method of claim 6, further comprising determining the prompt variables based on at least one of date, time, and number of messages.

9. The method of claim 7, wherein the accessing step further includes referencing a third XML document specified in the parsed second XML document that identifies nested prompt fragments utilized for multiple concatenated prompts.

10. The method of claim 1, wherein the identifying step includes parsing a first XML document configured for identifying the selected concatenated prompt from multiple available prompt based on a user preference specified in the prompt request.

11. A server system configured for dynamically generating a selected concatenated prompt in a selected language from stored prompt fragments, the server system comprising:
   a first executable resource configured for identifying a selected one of a plurality of concatenated prompts and a selected one of a plurality of languages, based on reception of a prompt request;
   second executable resources configured for accessing language-independent information for the concatenated prompts, respectively, the first executable resource configured for initiating execution of a corresponding selected one of the second executable resources based on identification of the corresponding selected concatenated prompt, the selected second executable resource configured for locating language-specific information for the corresponding selected concatenated prompt based on accessing the corresponding language-independent information; and
   a first database for storage of stored prompt fragments, the first executable resource accessing the language-specific information for the selected concatenated prompt based on location thereof by the corresponding selected second executable resource, the first executable resource generating the selected concatenated prompt in the selected language based on retrieval of a selected group of the stored prompt fragments identified by the language-specific information for the selected concatenated prompt.

12. The system of claim 11, further comprising a second database configured for storing the language-independent information for each of the concatenated prompts, the selected second executable resource obtaining the language-independent information for the corresponding selected concatenated prompt from the second database.

13. The system of claim 12, wherein the second database is configured for storing extensible markup language (XML) documents, each XML document configured for storing at least a portion of the language-independent information for a corresponding one of the concatenated prompts.

14. The system of claim 11, wherein the first database is further configured for storage of the language-specific information for the stored prompt fragments, the first database having multiple language portions for storage of the language-specific information and the stored prompt fragments according to the respective languages.

15. The system of claim 14, wherein each language portion is configured for storing the corresponding language-specific information as XML documents.

16. The system of claim 15, wherein each language portion is further configured for storing whole sentence prompts.

17. The system of claim 15, wherein each stored prompt fragment is stored as at least one of a text file representing a text-based prompt portion, and an audio file representing an audible prompt fragment.

18. The system of claim 15, wherein each language portion corresponds to a directory, the corresponding language-specific information and the stored prompt fragments in the corresponding language being stored and respective subdirectories.

19. The system of claim 15, wherein at least one of the XML documents specifies a nested prompt fragment for use in multiple concatenated prompts.

20. The system of claim 15, wherein each XML document specifies the stored prompt fragments for selection in generating the selected concatenated prompt, pointers to audio files corresponding to the stored prompt fragments, and display text to be presented during generation of the selected concatenated prompt.

21. The system of claim 15, wherein the XML documents for the selected concatenated prompt among the respective languages each has a same filename within the corresponding language directory, and includes a same number of prompt fragment fields for specifying the stored prompt fragments in the corresponding language.

22. A computer readable medium having stored thereon sequences of instructions for generating a concatenated prompt, the sequences of instructions including instructions for performing the steps of:
   identifying a selected concatenated prompt and a selected language based on reception of a prompt request;
   executing a selected executable resource for the selected concatenated prompt;
   obtaining, by the selected executable resource, language-independent information for the selected concatenated prompt from a database configured for storing the language-independent information for each of a plurality of concatenated prompts;
   accessing language-specific information for the selected concatenated prompt based on the obtained language-independent information for the selected concatenated prompt; and
   generating the selected concatenated prompt in the selected language based on selective retrieval of stored prompt fragments identified by the language-specific information for the selected concatenated prompt.

23. The medium of claim 22, wherein the executing step includes parsing a first XML document corresponding to the selected concatenated prompt.

24. The medium of claim 23, wherein the obtaining step includes identifying the language-specific information based on identification of a second XML document name from the first XML document.

25. The medium of claim 24, wherein the obtaining step further includes identifying a number of prompt fragment fields for specifying the stored prompt fragments for the corresponding selected concatenated prompt, each of the language-specific information for the selected concatenated prompt having a same number of prompt fragment fields, independent of the corresponding language.

26. The medium of claim 24, wherein the language-specific information for the selected concatenated prompt are stored in second XML documents based on respective languages, each of the second XML documents corresponding to the selected concatenated prompt having a same second XML document name and stored in a corresponding language directory, the accessing step including obtaining the second XML document for the selected language based on the second XML document name in the corresponding language directory.

27. The medium of claim 26, wherein the accessing step includes parsing the second XML document retrieved from the corresponding selected language directory and identifying relevant prompt fragment fields and nonrelevant prompt fragment fields from the parsed second XML document.

28. The medium of claim 27, wherein the accessing step further includes identifying the stored prompt fragments for generation of the selected concatenated prompt from the parsed second XML document based on the identified relevant prompt fragment fields and determined prompt variables.

29. The medium of claim 26, further comprising instructions for performing the step of determining the prompt variables based on at least one of date, time, and number of messages.

30. The medium of claim 28, wherein the accessing step further includes referencing a third XML document specified in the parsed second XML document that identifies nested prompt fragments utilized for multiple concatenated prompts.

31. The medium of claim 22, wherein the identifying step includes parsing a first XML document configured for identifying the selected concatenated prompt from multiple available prompt based on a user preference specified in the prompt request.

32. A server system configured for generating a concatenated prompt, the system comprising:
- means for identifying a selected concatenated prompt and a selected language based on reception of a prompt request;
- means for executing a selected executable resource for the selected concatenated prompt;
- means for obtaining, by the selected executable resource, language-independent information for the selected concatenated prompt from a database configured for storing the language-independent information for each of a plurality of concatenated prompts;
- means for accessing language-specific information for the selected concatenated prompt based on the obtained language-independent information for the selected concatenated prompt; and
- means for generating the selected concatenated prompt in the selected language based on selective retrieval of stored prompt fragments identified by the language-specific information for the selected concatenated prompt.

33. The system of claim 32, wherein the executing means includes means for parsing a first XML document corresponding to the selected concatenated prompt.

34. The system of claim 33, wherein the obtaining means identifies the language-specific information based on identification of a second XML document name from the first XML document.

35. The system of claim 34, wherein the obtaining means identifies a number of prompt fragment fields for specifying the stored prompt fragments for the corresponding selected concatenated prompt, each of the language-specific information for the selected concatenated prompt having a same number of prompt fragment fields, independent of the corresponding language.

36. The system of claim 34, wherein the language-specific information for the selected concatenated prompt are stored in second XML documents based on respective languages, each of the second XML documents corresponding to the selected concatenated prompt having a same second XML document name and stored in a corresponding language directory, the accessing means obtaining the second XML document for the selected language based on the second XML document name in the corresponding language directory.

37. The system of claim 36, wherein the accessing means parses the second XML document retrieved from the corresponding selected language directory and identifies relevant prompt fragment fields and nonrelevant prompt fragment fields from the parsed second XML document.

38. The system of claim 37, wherein the accessing means identifies the stored prompt fragments for generation of the selected concatenated prompt from the parsed second XML document based on the identified relevant prompt fragment fields and determined prompt variables.

39. The system of claim 37, further comprising means for determining the prompt variables based on at least one of date, time, and number of messages.

40. The system of claim 38, wherein the accessing means references a third XML document specified in the parsed second XML document that identifies nested prompt fragments utilized for multiple concatenated prompts.

41. The system of claim 32, wherein the identifying means parses a first XML document configured for identifying the selected concatenated prompt from multiple available prompt based on a user preference specified in the prompt request.

* * * * *